United States Patent [19]

Scott et al.

[11] Patent Number: 4,537,543

[45] Date of Patent: Aug. 27, 1985

[54] SECURITY LOCKING BOLT

[76] Inventors: Tommy L. Scott, Rte. 1, Box 322, De Berry, Tex. 75639; Morris C. Moss, P.O. Box 602, Carthage, Tex. 75633

[21] Appl. No.: 512,354

[22] Filed: Jul. 11, 1983

[51] Int. Cl.³ .................. F16B 35/00; F16B 41/00
[52] U.S. Cl. .................................. 411/371; 70/232; 411/338; 411/378; 411/427; 411/910
[58] Field of Search ............... 411/190, 366–368, 411/378, 427, 428, 910, 338, 339, 116, 119, 166, 371–373, 375; 70/229, 230, 232

[56] References Cited

U.S. PATENT DOCUMENTS

| | | |
|---|---|---|
| 280,125 | 6/1883 | Brauchler . |
| 439,279 | 10/1890 | Kramer . |
| 545,834 | 9/1895 | Williamson ............... 411/338 X |
| 857,295 | 6/1907 | Mudge . |
| 877,061 | 1/1908 | Earnest ........................... 411/338 |
| 1,495,820 | 5/1924 | Tierney ............................ 70/416 |
| 1,574,522 | 2/1926 | Stone ................................ 70/232 |
| 2,138,698 | 11/1938 | Heaston ...................... 411/116 X |
| 2,770,998 | 11/1956 | Schwartz . |
| 3,712,355 | 1/1973 | Schenk ......................... 411/190 X |
| 3,771,410 | 11/1973 | Swindt, II ....................... 411/338 |
| 3,785,670 | 1/1974 | Smith ........................... 70/230 X |
| 3,817,065 | 6/1974 | Sander ............................ 70/232 |
| 3,978,699 | 9/1976 | Kay 'Triniak ................... 70/232 |
| 4,253,509 | 3/1981 | Collet . |
| 4,341,053 | 7/1982 | Dettfurth et al. ............ 411/116 X |
| 4,358,941 | 11/1982 | Zimmer . |

FOREIGN PATENT DOCUMENTS 664329 1/1952 United Kingdom ............ 411/378

Primary Examiner—Robert L. Wolfe
Assistant Examiner—Lloyd A. Gall
Attorney, Agent, or Firm—John M. Harrison

[57] ABSTRACT

A security locking bolt for flanging "Christmas tree" installations, valves and other equipment to a pipeline header or a pipeline, which includes a bolt body having a partially threaded bore and a security bolt head integrally provided on one end and a cooperating locking head secured to the opposite end of the bolt body by means of an internally-seated locking bolt which threadably cooperates with the internal threads in the bolt body. In a preferred embodiment a roller bearing is also provided in the bolt body bore and an end cap closes the locking bolt access opening in the locking head. In another preferred embodiment of the invention a grease fitting is threadably inserted in the security bolt head and longitudinal apertures are provided in the roller bearing and the locking bolt in order to provide a means for inserting grease into the threaded bore and removing the end cap situated in the locking head, by application of pressure. In another preferred embodiment of the invention a key set is provided in the security bolt head to provide limited access to the grease fitting.

22 Claims, 8 Drawing Figures

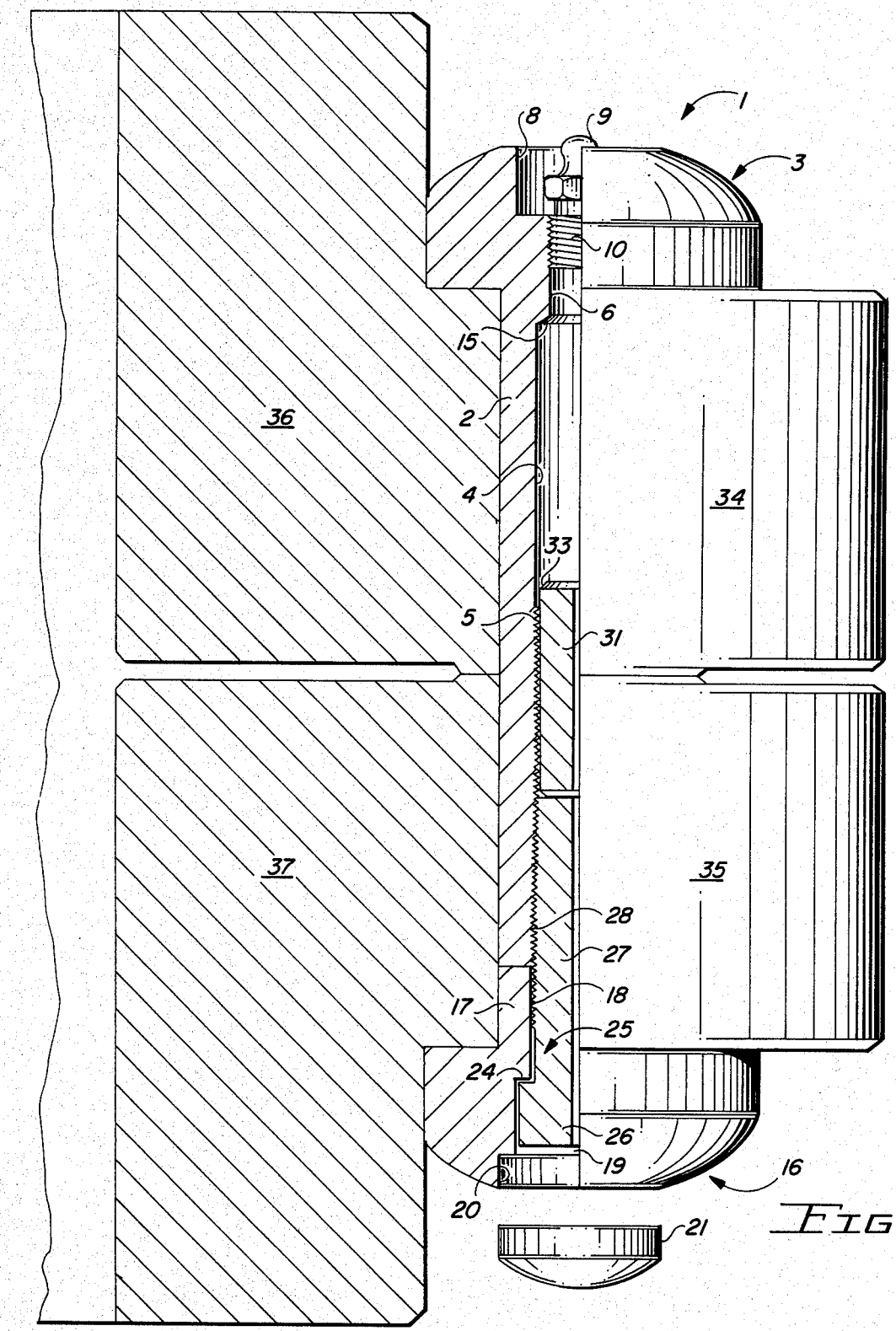
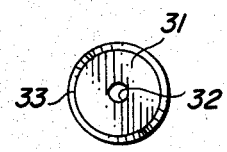
FIG-1
FIG-7
FIG-8

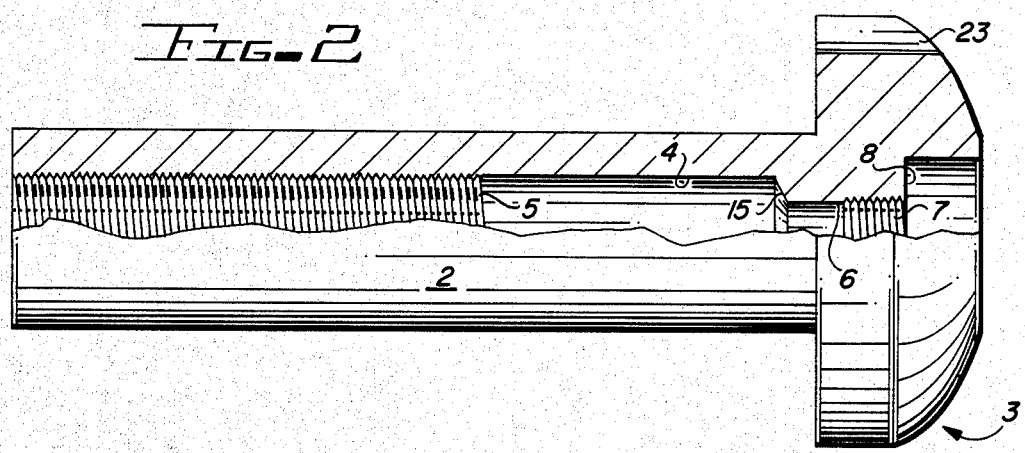
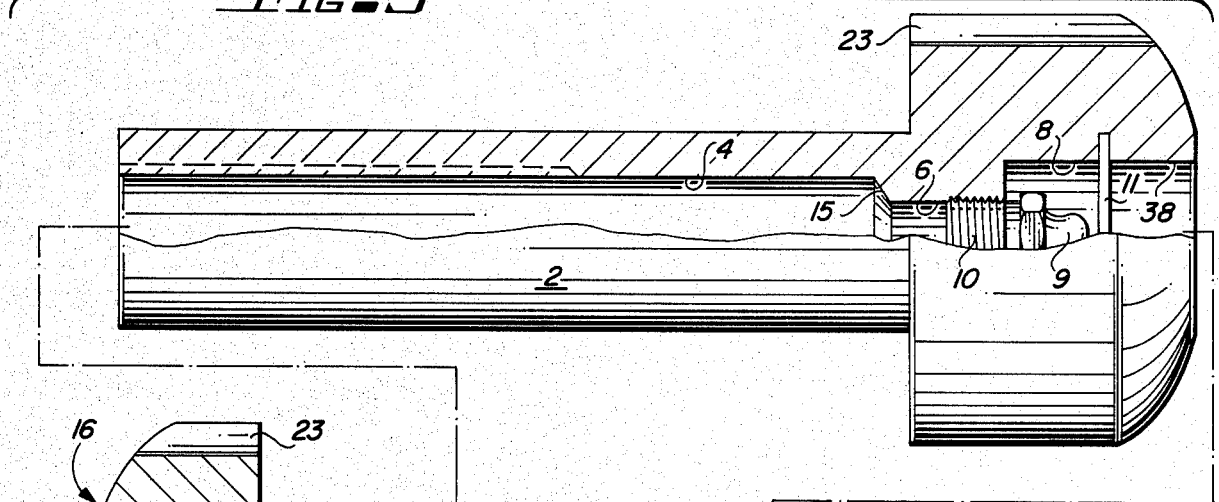
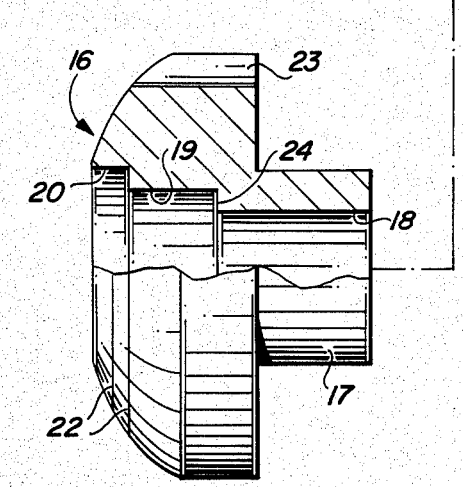
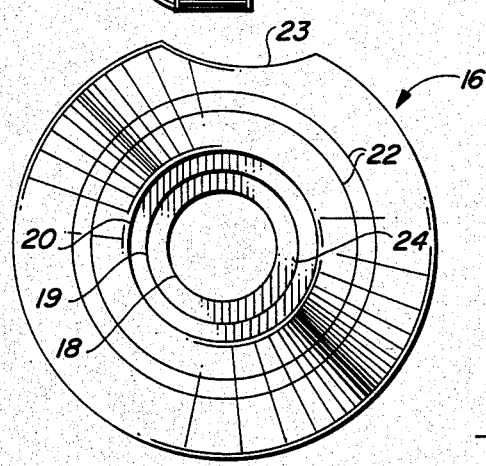
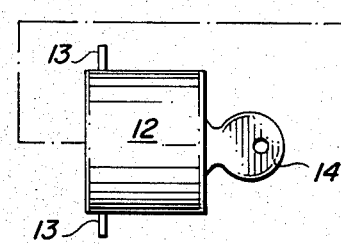
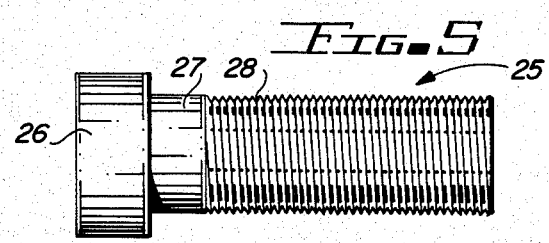
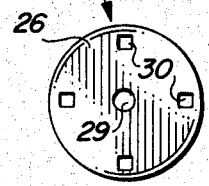

SECURITY LOCKING BOLT

BACKGROUND OF THE INVENTION

1. Field of the Invention

This invention relates to a means for securing the flange of a "Christmas tree" installation, valves or other equipment to cooperating flanges in pipeline headers and pipelines and more particularly, to a security locking bolt which is designed to secure such flanges and to prevent the unauthorized separation of the flanges to prevent theft of the "Christmas tree" installation or other equipment. In a preferred embodiment the security locking bolt of this invention includes a bolt body having a security bolt head integrally formed on one end thereof and provided with a hollow bore which is partially threaded to threadably receive a locking bolt for securing a locking head on the opposite end of the bolt body. The locking bolt is recessed inside the locking head and an end cap tightly covers the access opening which receives the locking bolt. In another preferred embodiment of the invention a hardened steel roller bearing is inserted in the bolt body bore between the locking bolt and the security bolt head in order to discourage removal of the security locking bolt by sawing the bolt at a point between the flanges. In yet another preferred embodiment of the invention the roller bearing and the locking bolt are each provided with an internal longitudinal aperture and a grease fitting is provided in the security bolt head in order to facilitate forcing grease through the grease fitting, into the barrel of the bolt body and through the apertures in the roller bearing and the locking bolt to remove the end cap by application of pressure.

2. Description of the Prior Art

Many attempts have been made in the prior art to develop a reliable mechanical means for locking flanges together in order to discourage the theft of "Christmas tree" equipment and other installations, such as valves, from pipelines and pipeline headers in oil and gas operations. An early "Nut Lock", is disclosed in U.S. Pat. No. 280,125, to F.C. Brauchler. The "Nut Lock" disclosed in this patent includes a primary bolt having an interior and exterior threaded leg, which exterior threads receive a primary nut provided with an extending flange member which is engagable with the head of a secondary bolt threadably secured in the threaded interior of the primary bolt and having a portion of the threaded shank extending from the head of the primary bolt to receive a secondary nut. When the secondary bolt is tightened on the secondary nut and against the flanges extending from the primary nut and the secondary nut is tightly secured against the head of the primary bolt, the nut lock is in functional configuration to secure a pair of flanges or other mechanical contrivances, as desired. U.S. Pat. No. 439,279, to J. Kramer et al, discloses a "Nut Lock", which is similar to the "Nut Lock" described in U.S. Pat. No. 280,125. In the case of the Kramer "Nut Lock", the primary bolt is threaded internally through only a portion of its length and a second bolt is inserted in the internally-threaded primary bolt shank to secure the nut in position on the primary bolt. U.S. Pat. No. 857,295, to H.H Mudge, discloses a "Bolt" having a cap covering the access drive opening thereof, which cap is fitted with cap screws having shaped heads which require a specialized tool for removal to provide access to the drive opening in the bolt. Similarly, U.S. Pat. No. 2,770,998, to R. F. Schwartz, discloses a "Tamper-Proof Screw having Frusto-Conical Head With Flat Tool Engaging Facets Thereon". The screw of this invention is characterized by a head having a particular shape which requires a specialized tool to engage the head and remove the bolt. U.S. Pat. No. 4,253,509, to James R. Collet, discloses a "Theft Deterrent Locking Nut" for securing flanges, which apparatus includes a nut-like device having a smooth outer surface which is resistant to the effects of conventional wrenches, a male threaded member having an internally-threaded axial bore adapted to threadably engage the nut-like member, a locking screw for threadably engaging the internal bore of the male member and having a head that mates with the smooth outer surface of the nut-like device and an environmental plug for insertion into the driving recess or bore of the screw to prevent foreign and corrosive matter from entering the recess. The locking screw threads are of opposite turn with respect to that of the nut-like device, so that the locking screw must first be removed before the nut may be removed. With the locking screw in place the driving recess of the nut is inaccessible, the locking screw head having conformed to the configuration of the nut to form an essentially uniform, smooth and continuous outer surface which is virtually inoperable by conventional wrenches. A "Security Method and Apparatus" is disclosed in U.S. Pat. No. 4,358,941, to John C. Zimmer, which device includes a bolt having a first hole drilled radially therein, a second threaded hole drilled axially therein to intersect the first hole and a third hole formed axially therein connecting the second hole with the end of the bolt. A bar is insertable into the first hole to extend radially outside of the bolt to prevent a nut from being removed from the bolt. The bar is secured in the bolt by means of a pickproof lock which has a screw portion threadably engagable with the second hole to engage the bar and a lock body configured to fit the third hole.

One of the problems inherent in most of the prior art locking devices for securing flanges in oilfield equipment is the susceptibility of these devices to failure due to the use of cutting torches and saws. The theft of oil and gas field valves, Christmas trees and related equipment from wellheads located in remote and unguarded areas is reaching epidemic proportions in this country and over the world. In a very short time, a thief using conventional adjustable wrenches or a cutting torch or saw equipment can unbolt or cut a wellhead Christmas tree and remove it from the wellhead casing flange. When the cost of the Christmas tree and the loss of production of oil or gas, as well as the man hours required to replace the equipment and to restore the well to the on-stream condition is considered, it will be realized that the theft of such equipment can be an extremely costly proposition.

Accordingly, it is an object of this invention to provide a new and improved security locking bolt which is designed to deter thieves and reduce the theft of oilfield valves and equipment, including Christmas tree installations and other equipment in the oilfield.

Another object of the invention is to provide a security locking bolt which is inexpensive to manufacture, easy to install and disassemble with the proper tools and extremely difficult to remove by would-be thieves without these tools.

Another object of this invention is to provide a security locking bolt for securing flanges in oilfield pipelines, headers and equipment, which can be quickly and easily assembled and disassembled using the proper tools and which cannot be disassembled when locked without the use of such tools.

Another object of this invention is to provide a new and improved security locking bolt which is characterized by a stainless steel body intergrally carrying a bolt head at one end and a removable locking head at the opposite end, which body includes an internally-threaded bore capable of receiving a recessed locking bolt to removably secure the locking head onto the bolt body in oppositely-disposed relationship with respect to the bolt head, wherein the recessed locking bolt is not accessible for removal except by use of specified tools.

A still further object of this invention is to provide a security locking bolt having a body portion, a fixed head and a removable locking head on opposite ends, which body portion includes a partially threaded bore, a hardened steel roller bearing rotatably positioned in the bore to deter cutting of the bolt body by a saw or other abrasive means and a recessed locking bolt cooperating with the locking head and the threads in the bore to removably secure the locking head on the body portion.

SUMMARY OF THE INVENTION

These and other objects of the invention are provided in a new and improved security locking bolt which is characterized by a stainless steel body having a partially threaded internal bore and a bolt head integrally formed on one end thereof, with a locking head shaped for removable attachment to the opposite end of the body by means of a threaded locking bolt which cooperates with the threads in the internal bore of the body and is recessed inside the locking head and contained therein by means of a locking cap. In a preferred embodiment of the invention a hardened steel roller bearing having a diameter smaller than the internal bore is positioned in the bore adjacent the locking bolt to discourage cutting of the bolt body by a saw, and a grease fitting, secured by an optional lock set, is provided in the bolt head secured to one end of the body to facilitate removal of the locking cap by injecting grease into the body bore in order to provide access to the locking bolt for disassembly of the security locking bolt.

BRIEF DESCRIPTION OF THE DRAWINGS

The invention will be better understood by reference to the accompanying drawings, wherein:

FIG. 1 is a side view, partially in section, of a preferred embodiment of the security locking bolt in functional position joining a pair of flanges carrying pipe segments;

FIG. 2 is a side elevation, partially in section, of a first preferred bolt body and bolt head portion of the security locking bolt;

FIG. 3 is a side elevation, partially in section, of another embodiment of the bolt body and bolt head portion with the locking head of the security locking bolt;

FIG. 4 is an end elevation of a preferred locking head of the security locking bolt;

FIG. 5 is a side elevation of a locking bolt used to secure the locking head to the bolt body;

FIG. 6 is an end elevation of the locking bolt illustrated in FIG. 5;

FIG. 7 is a side elevation of a steel roller bearing for insertion in the security locking bolt 1; and FIG. 8 is an end elevation of the roller bearing illustrated in FIG. 7.

DESCRIPTION OF THE PREFERRED EMBODIMENT

Referring now to the drawings, in a preferred embodiment the security locking bolt of this invention is generally illustrated in functional position by reference numeral 1 and includes a bolt body 2, having a security bolt head 3 integrally formed on one end thereof. The bolt body 2 extends through apertures provided in a top flange 34 and a bottom flange 35, to join the top flange 34 to the bottom flange 35, in a top pipe segment 36, carrying the top flange 34 and a bottom pipe segment 37, carrying the bottom flange 35, as illustrated. Accordingly, when the security locking bolt 1 is in the locked configuration illustrated in FIG. 1, it will be appreciated that the top pipe segment 36 is secured to the bottom pipe segment 37 by attachment of the top flange 34 to the bottom flange 35. This locked mating of the top flange 34 to the bottom flange 35 is achieved by means of the locking head 16, which is secured to the opposite end of the bolt body 2 by means of a locking bolt 25, which in turn cooperates with bore threads 5, extending throughout at least a portion of the length of the bore 4 and located inside the bolt body 2. As illustrated in FIG. 3, the locking head 16 is provided with a locking head body 17, which is coextensive with the bolt body 2 when in locked, functional configuration, as illustrated in FIG. 1 and includes a locking head aperture 18, which is in turn coextensive with the bore 4, provided inside the bolt body 2 when the locking head 16 is secured to the bolt body 2. Furthermore, a locking head bore 19 is also provided inside the locking head 16 and is larger in diameter than the locking head aperture 18, in order to define a locking head shoulder 24, which receives the bottom edge of the locking bolt head 26 of locking bolt 25, when the locking bolt 25 is inserted in the locking head bore 19 and locking head aperture 18, as hereinafter described. Engagement of the bore threads 5 with the male locking bolt threads 28 on the locking bolt shank 27, serves to securely tighten the locking head 16 onto the bolt body 2, with the locking bolt head 26 secured against the locking head shoulder 24 adjacent the locking head bore 19, as illustrated in FIG. 1. Referring to FIGS. 1, 7 and 8, in a most preferred embodiment of the invention a hardened steel roller bearing 31, having a bevel 33 and provided with an internal roller bearing aperture 32, is inserted in the bore 4 of the bolt body 2 prior to threadable insertion of the locking bolt 25 in the bore 4 and is capable of rotating in the bore 4. Furthermore, in this embodiment of the invention the locking bolt 25 is further provided with a locking bolt aperture 29, which runs throughout the length of the locking bolt 25, as illustrated in FIG. 6 of the drawing. A grease fitting 9 is also recessed in the grease fitting bore 8 of the security bolt head 3 and is threadably inserted in the bore neck threads 7 of the bore neck 6, which communicates with the bore 4 at bore shoulder 15. The internal bore neck threads 7 are provided in the upper portion of the bore neck 6 in order to receive the external grease fitting threads 10, provided in the shank of the grease fitting 9, as illustrated in FIGS. 1 and 3 of the drawings. An end cap 21 is tightly fitted in an end cap seat 20, provided in the locking head 16 in order to prevent access to the locking bolt 25 and removal of the locking bolt 25 from the interior of the security locking bolt 1. Accordingly, it will be appreciated that when the end cap 21 is tightly inserted in the end cap seat 20, then removal of the end cap 21 can only be achieved by forcing grease through the grease fitting 9, into the bore 4 and through the roller bearing aperture 32 of the roller bearing 31 and the locking bolt aperture 29 of the locking bolt 25, to exert fluid pressure on the end cap 21.

Referring now to FIG. 3 of the drawing in another most preferred embodiment of the invention, the security bolt head 3 is somewhat thicker than the security bolt head 3 illustrated in FIGS. 1 and 2 and a lock set bore 38 is provided co-extensively with the grease fitting bore 8, which accommodates the grease fitting 9. A lock set slot 11 is also provided in the walls of the security bolt head 3 between the grease fitting bore 8 and the lock set bore 38. A lock set 12 is designed to register with the lock set bore 38 and is provided with key-operated, extensible lock set flanges 13 and a key 14, which lock set flanges 13 selectively engage the lock set slot 11 by operation of the key 14, to prevent access to the grease fitting 9.

Referring again to FIGS. 1, 4, 5 and 6 of the drawings, it will be appreciated that engaging slots 30 of selected size, spacing and configuration are provided in the locking bolt head 26, in order to accommodate a tool of special design for the assembly and disassembly of the security locking bolt 1 by threadably engaging and disengaging the locking bolt 25 in the bolt body 2. Furthermore, as illustrated in FIG. 4 of the drawing, ring scribes 22 may be provided on the outer surface of the locking head 16 in order to further confuse would-be thieves. Also, in another most preferred embodiment of the invention a radius 23 is provided in the periphery of the locking head 16 and the security bolt head 3, in order to facilitate engagement of the radius 23 in the locking head 16 with the bottom pipe segment 37 and engagement of the radius 23 in the security bolt head 3 with the top pipe segment 36, as illustrated in FIG. 1, to prevent rotation of the security locking bolt 1 with respect to the top flange 34 and the bottom flange 35.

In operation, the security locking bolt 1 of this invention is installed on the top flange 34 and bottom flange 35 of a top pipe segment 36 and a bottom pipe segment 37, respectively, as follows. The security locking bolt 1 is first presented in disassembled form, as illustrated in FIGS. 2-8, in either a version without the lock set 12, as illustrated in FIG. 2 or including the lock set 12, as illustrated in FIG. 3. When the FIG. 2 version of the security locking bolt 1 is used, the bolt body 2 is initially inserted through the aperture in the top flange 34 and the bottom flange 35 with the radius 23 in the security bolt head 3 positioned adjacent the curvature of the top pipe segment 36, as illustrated in FIG. 1. The locking head 16 is then positioned adjacent the bottom flange 35, with the radius 23 of the locking cap 16 positioned adjacent the bottom pipe segment 37 and the locking head body 17 is matched with the projecting end of the bolt body 2, as illustrated in FIG. 1. The shank 27 of the locking bolt 25 is then inserted through the end cap seat 20, the locking head bore 19 and the locking head aperture 18, with the locking bolt threads 28 in engagement with the internal bore threads 5, situated in the bore 4. The locking bolt 25 is then tightened inside the bolt body 2 by use of a specific tool which is designed for engagement with the engaging slots 30, provided in the locking bolt head 26, until the locking head 16 is tightly secured on the bolt body 2, as illustrated in FIG. 1. When this assembly is accomplished, the end cap 21 is fitted into the end cap seat 20, in order to seal the locking bolt 25 tightly inside the locking head 16 and the bolt body 2. Under circumstances where a saw might possibly be used to cut the bolt body 2 and separate the security bolt head 3 from the locking head 16, a roller bearing 31 is inserted into the bore 4 ahead of the locking bolt 25, as illustrated in FIG. 1. This expedient prevents complete severing of the bolt body 2 by a saw, since the roller bearing 31 is permitted to rotate inside the barrel 4 when contacted by a saw blade.

Referring again to FIG. 3 of the drawings under circumstances where it is desired to use a lock set 12 in the bolt head 3, the procedure described above is followed and after the end cap 21 is inserted in the end cap seat 20, the lock set 12 is inserted into the lock set bore 38 and the key 14 turned to seat the lock set flanges 13 in the lock set slot 11, to secure the lock set 12 in the bolt head 3. Accordingly, when the lock set flanges 13 are so extended and seated in the lock set slot 11 and the key 14 is removed from the lock set 12, access to the grease fitting 9 is prevented and the end cap 21 cannot be removed from the locking head 16 by using fluid pressure.

When it is desired to remove the security locking bolt 1 from engagement with the top flange 34 and the bottom flange 35 in that version of the security locking bolt 1 illustrated in FIG. 2, the grease-dispensing end of a grease gun is placed in engagement with the grease fitting 9 and the grease is forced through the grease fitting 9, into the barrel 4 and through the roller bearing aperture 32 and the locking bolt aperture 29, to remove the end cap 21 by fluid pressure. When the end cap 21 is removed from the end cap seat 20, the locking bolt 25 is disengaged from the barrel 4 by counterclockwise manipulation of a tool which is compatible with the engaging slots 30 and the locking head 16 is removed to facilitate removal of the bolt body 2 and the attached security bolt head 3. In the case of the security locking bolt 1 illustrated in FIG. 3, the procedure is the same after removal of the lock set 12 by use of the key 14 in the manner heretofore described.

In yet another preferred embodiment of the invention the end cap 21 is brass in order to prevent removal of the end cap 21 from the end cap seat 20 by either magnetic means or by welding a hook or connector thereon for removal by force. Furthermore, the diameter of the end cap 21 should be from about 0.005 to about 0.010 of an inch smaller than the diameter of the end cap seat 20, in order to insure a tight fit. In this regard, it will be appreciated by those skilled in the art that in a most preferred embodiment of the invention the bolt body 2, security bolt head 3 and the locking head 16 are shaped from stainless steel to discourage destruction by a cutting torch. Furthermore, as heretofore described, the roller bearing 31 is formed of case-hardened steel and is characterized by a diameter which is less than the internal diameter of the bore 4, in order to facilitate rotation of the roller bearing 31 inside the bore 4 and provide resistance to a saw which might be employed to sever the security locking bolt 1 at the bolt body 2. While the roller bearing 31 illustrated in the drawings is short relative to that portion of the length of the bore 4 which is not provided with bore threads 5, it is sufficiently long to protect the area of risk adjacent the slots between the top flange 34 and the bottom flange 35, as illustrated in FIG. 1 and can be provided in units which are as long as is deemed to be necessary and expedient.

Referring again to FIG. 1 of the drawings, it will be appreciated that a minimum of one, and preferebly two security locking bolts 1 should be used in each installation in cooperation with conventional bolts in flanging the top flange 34 and bottom flange 35 together. While a single security locking bolt 1 serves as a significant deterrent to theft, two security locking bolts 1 in oppositely-disposed relationship provide maximum protection from theft. Furthermore, referring again to FIGS. 1 and 4, a "dummy", or non-functional grease fitting 9 can be used in the security bolt head 3 in cooperation with, or in place of the ring scribes 22, in order to further confuse would-be thieves. In a most preferred embodiment of the invention the ring scribes 22 are provided in the security bolt head 3 to mask the peripheral line of insertion of the end cap 21 in the end cap seat 20 and a "dummy" grease fitting 9 is provided in the grease fitting bore 8, to confuse the would-be thieves. In yet another preferred embodiment the ring scribes 22 are provided in a security bolt head 3 which carries a real, or functional grease fitting 9 and a radius 23.

While the preferred embodiments of the invention have been desribed above, it will be recognized and understood that various modifications and combinations may be made and used therein and the appended claims are intended to cover all such modifications and combinations which may fall within the spirit and scope of the invention.

Having described my invention with the particularity set forth above what is claimed is:

1. A security locking bolt comprising a bolt body having an internal bore and bore threads provided in at least a portion of said bore; a security bolt head provided on one end of said bolt body; a locking head having a locking head body engaging the opposite end of said bolt body from said security bolt head; a locking head cavity in said locking head, said locking head cavity extending through said locking head body and communicating with said bore; a locking bolt removably recessed in said locking head cavity and extending into said bore in threadable cooperation with said bore threads; a locking bolt aperture extending axially through said locking bolt; and end cap tightly pressed into said locking head cavity and a grease fitting provided in said security bolt head and in communication with said internal bore, whereby grease inserted in said grease fitting and said internal bore causes removal of said end cap from said locking head; and engaging means in cooperation with said locking bolt for receiving a tool and securing said locking head to said bolt body responsive to manipulation of the tool.

2. The security locking bolt of claim 1 further comprising a roller bearing rotatable in said bore, said roller bearing having a roller bearing aperture extending axially therethrough.

3. The security locking bolt of claim 1 further comprising a lock set bore in said security bolt head and a lock set in registration with said lock set bore, whereby access to said grease fitting is prevented when said lock set is locked in said security bolt head.

4. The security locking bolt of claim 1 further comprising:
   (a) a roller bearing rotatable in said bore, said roller bearing having a roller bearing aperture extending axially therethrough;
   (b) a lock set bore in said security bolt head and a lock set in registration with said lock set bore, whereby access to said grease fitting is prevented when said lock set is locked in said security bolt head; and
   (c) a first radius shaped in the periphery of said security bolt head and a second radius shaped in the periphery of said locking head, whereby said first radius and said second radius are disposed adjacent respective segments of pipe carried by flanges receiving said security locking bolt and rotation of said security locking bolt with respect to the flanges is prevented.

5. The security locking bolt of claim 4 wherein said end cap is brass.

6. The security locking bolt of claim 4 wherein said locking bolt body, said security bolt head and said locking head are stainless steel.

7. The security locking bolt of claim 4 wherein said end cap is brass and said locking bolt body, said security bolt head and said locking head are stainless steel.

8. The security locking bolt of claim 1 further comprising ring scribes provided in said locking head in concentric relationship with respect to the periphery of said end cap.

9. The security locking bolt of claim 1 further comprising:
   (a) a roller bearing rotatable in said bore, said roller bearing have a roller bearing aperture extending axially therethrough;
   (b) a lock set bore in said security bolt head and a lock set in registration with said lock set bore, whereby access to said grease fitting is prevented when said lock set is locked in said security bolt head;
   (c) a first radius shaped in the periphery of said security bolt head and a second radius shaped in the periphery of said locking head, whereby said first radius and said second radius are disposed adjacent respective segments of pipe carried by flanges receiving said security locking bolt and rotation of said security locking bolt with respect to the flanges is prevented; and
   (d) ring scribes provided in said locking head in concentric relationship with respect to the periphery of said end cap.

10. A security locking bolt for securing flanges comprising:
    (a) a bolt body;
    (b) a bore extending through said bolt body and bore threads provided in said bore;
    (c) a security bolt head integrally provided in one end of said bolt body and having a cavity communicating with said bore;
    (d) a grease fitting threadably inserted in said cavity;
    (e) a locking head having a locking head body removably joining the end of said bolt body opposite said security bolt head and an aperture extending through said locking head and said locking head body and communicating with said bore;
    (f) a locking bolt having a locking bolt head, a threaded locking bolt shank and an aperture extending axially through said locking bolt head and said locking bolt shank, said locking bolt extending into said aperture and said locking bolt shank provided in threadable engagement with said bore threads and said locking bolt head recessed in said aperture; and
    (g) an end cap tightly closing said aperture and sealing said locking bolt in said aperture and said bore, whereby removal of said locking head from said bolt body is prevented.

11. The security locking bolt of claim 10 further comprising engaging means in cooperation with said locking bolt head, whereby said locking bolt head can only be rotated with a tool designed to cooperate with said engaging means to selectively and threadably seat and unseat said locking bolt in said bore.

12. The security locking bolt of claim 10 further comprising a lock set bore in said security bolt head and a lock set in registration with said lock set bore, whereby access to said grease fitting is prevented when said lock set is locked in said security bolt head.

13. The security locking bolt of claim 12 further comprising a first radius shaped in the periphery of said security bolt head and a second radius shaped in the periphery of said locking head, whereby said first radius and said second radius are disposed adjacent respective segments of pipe carried by flanges receiving said security locking bolt and rotation of said security locking bolt with respect to the flanges is prevented.

14. The security locking bolt of claim 10 further comprising:
(a) engaging means in cooperation with said locking bolt head, whereby said locking bolt head can only be rotated with a tool designed to cooperate with said engaging means to selectively and threadably seat and unseat said locking bolt in said bore; and
(b) a lock set bore in said security bolt head and a lock set in registration with said lock set bore, whereby access to said grease fitting is prevented when said lock set is locked in said security bolt head.

15. The security locking bolt of claim 10 further comprising a roller bearing rotatable in said bore and a roller bearing aperture provided axially in said roller bearing.

16. The security locking bolt of claim 10 further comprising:
(a) a roller bearing rotatable in said bore and a roller bearing aperture provided axially in said roller bearing;
(b) a key set slot in said cavity and a key-operated key set means operable to selectively engage said key slot responsive to manipulation of a key, whereby said key set means can be locked in said cavity to seal said grease fitting; and
(c) engaging means in cooperation with said locking bolt head, whereby said locking bolt head can only be rotated with a tool designed to cooperate with said engaging means to selectively and threadably seat and unseat said locking bolt in said bore.

17. The security locking bolt of claim 10 further comprising:
(a) a roller bearing rotatable in said bore and a roller bearing aperture provided axially in said roller bearing;
(b) a key set slot in said cavity and a key-operated key set means operable to selectively engage said key slot responsive to manipulation of a key, whereby said key set means can be locked in said cavity to seal said grease fitting;
(c) engaging means in cooperation with said locking bolt head, whereby said locking bolt head can only be rotated with a tool designed to cooperate with said engaging means to selectively and threadably seat and unseat said locking bolt; and
(d) a first radius shaped in the periphery of said security bolt head and a second radius shaped in the periphery of said locking head, whereby said first radius and second radius are disposed adjacent respective segments of pipe carried by flanges receiving said security locking bolt and rotation of said security locking bolt with respect to the flanges is prevented.

18. A security locking bolt for securing flanges comprising:
(a) a bolt body formed of stainless steel;
(b) a bore extending through said bolt body and bore threads provided in a portion of said bore;
(c) a security bolt head formed of stainless steel and integrally provided in one end of said bolt body and having a cavity communicating with said bore;
(d) a grease fitting threadably inserted in said cavity;
(e) a locking head formed of stainless steel and having a locking head body joining the end of said bolt body opposite said security bolt head and an aperture extending through said locking head and said locking head body and communicating with said bore;
(f) a locking bolt having a locking bolt head, a threaded locking bolt shank and an aperture extending axially through said locking bolt head and said locking bolt shank, said locking bolt extending into said aperture and said locking bolt shank provided in threadable engagement with said bore threads and said locking bolt head recessed in said aperture;
(g) an end cap formed of brass and tightly closing said aperture and sealing said locking bolt in said aperture and said bore, whereby removal of said locking head from said bolt body is prevented;
(h) engaging means in cooperation with said locking bolt head, whereby said locking bolt head can only be rotated with a tool designed to cooperate with said engaging means to selectively and threadably seat and unseat said locking bolt in said bore; and
(i) a key set slot in said cavity and a key-operated key set means operable to selectively engage said key set slot responsive to manipulation of a key, whereby said key set means can be locked in said cavity to seal said grease fitting.

19. The security locking bolt of claim 18 further comprising a roller bearing rotatable in said bore and a roller bearing aperture provided axially in said roller bearing, whereby grease introduced into said grease fitting and said bore forces said end cap from said locking head.

20. The security locking bolt of claim 18 further comprising ring scribes provided in said locking head in concentric relationship with respect to the periphery of said end cap.

21. The security locking bolt of claim 18 further comprising a first radius shaped in the periphery of said security bolt head and a second radius shaped in the periphery of said locking head, whereby said first radius and said second radius are disposed adjacent respective segments of pipe carried by flanges receiving said security locking bolt and rotation of said security locking bolt with respect to the flanges is prevented.

22. The security locking bolt of claim 18 further comprising:
(a) a roller bearing rotatable in said bore and a roller bearing aperture provided axially in said roller bearing, whereby grease introduced into said grease fitting and said bore forces said end cap from said locking head;
(b) ring scribes provided in said locking head in concentric relationship with respect to the periphery of said end cap; and (c) a first radius shaped in the periphery of said security bolt head and a second radius shaped in the periphery of said locking head, whereby said first radius and said second radius are disposed adjacent respective segments of pipe carried by flanges receiving said security locking bolt and rotation of said security locking bolt with respect to the flanges is prevented.

* * * * *